(12) United States Patent
Rakshit

(10) Patent No.: US 8,775,530 B2
(45) Date of Patent: Jul. 8, 2014

(54) COMMUNICATION MANAGEMENT METHOD AND SYSTEM

(75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 12/868,078

(22) Filed: Aug. 25, 2010

(65) Prior Publication Data

US 2012/0054284 A1    Mar. 1, 2012

(51) Int. Cl.
  *G06F 15/16*    (2006.01)
  *G06Q 10/10*    (2012.01)

(52) U.S. Cl.
  CPC .................................. *G06Q 10/107* (2013.01)
  USPC ....................................................... 709/206

(58) Field of Classification Search
  CPC ................................................... G06Q 10/107
  USPC ....................................................... 709/206
  See application file for complete search history.

(56) References Cited

U.S. PATENT DOCUMENTS

| | | | |
|---|---|---|---|
| 8,209,183 B1 * | 6/2012 | Patel et al. .................... | 704/270 |
| 2003/0101153 A1 | 5/2003 | Francis et al. | |
| 2004/0141004 A1 | 7/2004 | Cabezas et al. | |
| 2006/0119583 A1 * | 6/2006 | Potera ........................... | 345/171 |
| 2007/0106730 A1 * | 5/2007 | Bhakta et al. ................. | 709/206 |
| 2007/0288577 A1 | 12/2007 | Kronlund et al. | |
| 2008/0034043 A1 | 2/2008 | Gandhi et al. | |
| 2009/0079816 A1 | 3/2009 | Qvarfordt et al. | |
| 2009/0119371 A1 | 5/2009 | Chang et al. | |
| 2009/0307315 A1 * | 12/2009 | Murphy et al. ............... | 709/206 |
| 2009/0318130 A1 * | 12/2009 | Naylor et al. ................. | 455/423 |
| 2010/0049520 A1 | 2/2010 | Stewart et al. | |
| 2010/0082512 A1 * | 4/2010 | Myerson et al. ................ | 706/45 |
| 2011/0022387 A1 * | 1/2011 | Hager .......................... | 704/235 |
| 2012/0054284 A1 * | 3/2012 | Rakshit ........................ | 709/206 |
| 2012/0246719 A1 * | 9/2012 | Bhamidipaty et al. .......... | 726/22 |
| 2012/0284015 A1 * | 11/2012 | Drewes ............................. | 704/3 |

* cited by examiner

*Primary Examiner* — Jerry Dennison
(74) *Attorney, Agent, or Firm* — Schmeiser, Olsen & Watts; John Pivnichny

(57) ABSTRACT

A communication management method and system. The method includes receiving by a computer processor, user defined data. The computer processor generates an email comprising the user defined data and retrieves an email address associated with a recipient for the email. The computer processor compares the email address to cultural data and determines a cultural region associated with the recipient. The computer processor retrieves content from the email and compares the content to cultural rules associated with the cultural region. The computer processor determines if any of the content conflicts with the cultural rules and performs functions associated with the email.

12 Claims, 11 Drawing Sheets

COMMUNICATION MANAGEMENT METHOD AND SYSTEM

FIELD OF THE INVENTION

The present invention relates to a method and associated system for managing communications for individuals.

BACKGROUND OF THE INVENTION

Managing multiple communications between parties typically comprises an inefficient process with little flexibility. Parties are typically allowed to communicate without any regard to additional factors. Parties communicating without regard to additional factors may result in communication issues.

SUMMARY OF THE INVENTION

The present invention provides a method comprising: receiving, by a computer processor of a computing device from a user, first user defined data; generating, by the computer processor, a first email comprising the first user defined data; retrieving, by the computer processor from the first email, an email address associated with a recipient for the first email; comparing, by the computer processor, the email address to cultural data; determining, by the computer processor based on results of the comparing the email address, a cultural region associated with the recipient; retrieving, by the computer processor from the first email, content from the email; comparing, by the computer processor, the content to cultural rules associated with the cultural region; determining, by the computer processor based on results of the comparing the content, if any of the content conflicts with the cultural rules; and performing, by the computer processor based on results of the determining if any of the content conflicts with the cultural rules, functions associated with the first email.

The present invention provides a computer program product, comprising a computer readable storage medium having a computer readable program code embodied therein, the computer readable program code comprising an algorithm adapted to implement a method within a computing device, the method comprising: receiving, by a computer processor of the computing device from a user, first user defined data; generating, by the computer processor, a first email comprising the first user defined data; retrieving, by the computer processor from the first email, an email address associated with a recipient for the first email; comparing, by the computer processor, the email address to cultural data; determining, by the computer processor based on results of the comparing the email address, a cultural region associated with the recipient; retrieving, by the computer processor from the first email, content from the email; comparing, by the computer processor, the content to cultural rules associated with the cultural region; determining, by the computer processor based on results of the comparing the content, if any of the content conflicts with the cultural rules; and performing, by the computer processor based on results of the determining if any of the content conflicts with the cultural rules, functions associated with said first email.

The present invention provides a method comprising: receiving, by a computer processor of a computing device for a user, an email comprising first data; generating, by said computer processor in response to a command and reply data from said user, a reply email associated with said email, said reply email comprising said reply data and the first data; enabling, by the computer processor, email reply check functionality; identifying, by the computer processor in response to the enabling, a first plurality of character strings from the first data of the reply email; identifying, by the computer processor in response to the enabling, a second plurality of character strings from the reply data of the reply email; comparing, by the computer processor, the first plurality of character strings to the second plurality of character strings; determining, by the computer processor based on results of the comparing, if each character string of the second plurality of character strings is associated with and in reply to a character string of the first plurality of character strings; and performing, by the computer processor based on results of the determining if each character string of the second plurality of character strings is associated with and in reply to a character string of the first plurality of character strings, functions associated with the reply email.

The present invention provides a computer program product, comprising a computer readable storage medium having a computer readable program code embodied therein, the computer readable program code comprising an algorithm adapted to implement a method within a computing device, the method comprising: receiving, by a computer processor of the computing device for a user, an email comprising first data; generating, by the computer processor in response to a command and reply data from the user, a reply email associated with the email, the reply email comprising the reply data and the first data; enabling, by the computer processor, email reply check functionality; identifying, by the computer processor in response to the enabling, a first plurality of character strings from the first data of the reply email; identifying, by the computer processor in response to the enabling, a second plurality of character strings from the reply data of the reply email; comparing, by the computer processor, the first plurality of character strings to the second plurality of character strings; determining, by the computer processor based on results of the comparing, if each character string of the second plurality of character strings is associated with and in reply to a character string of the first plurality of character strings; and performing, by the computer processor based on results of the determining if each character string of the second plurality of character strings is associated with and in reply to a character string of the first plurality of character strings, functions associated with the reply email.

The present invention advantageously provides a simple method and associated system capable of managing multiple communications between parties.

DETAILED DESCRIPTION OF THE INVENTION

Figure 1:
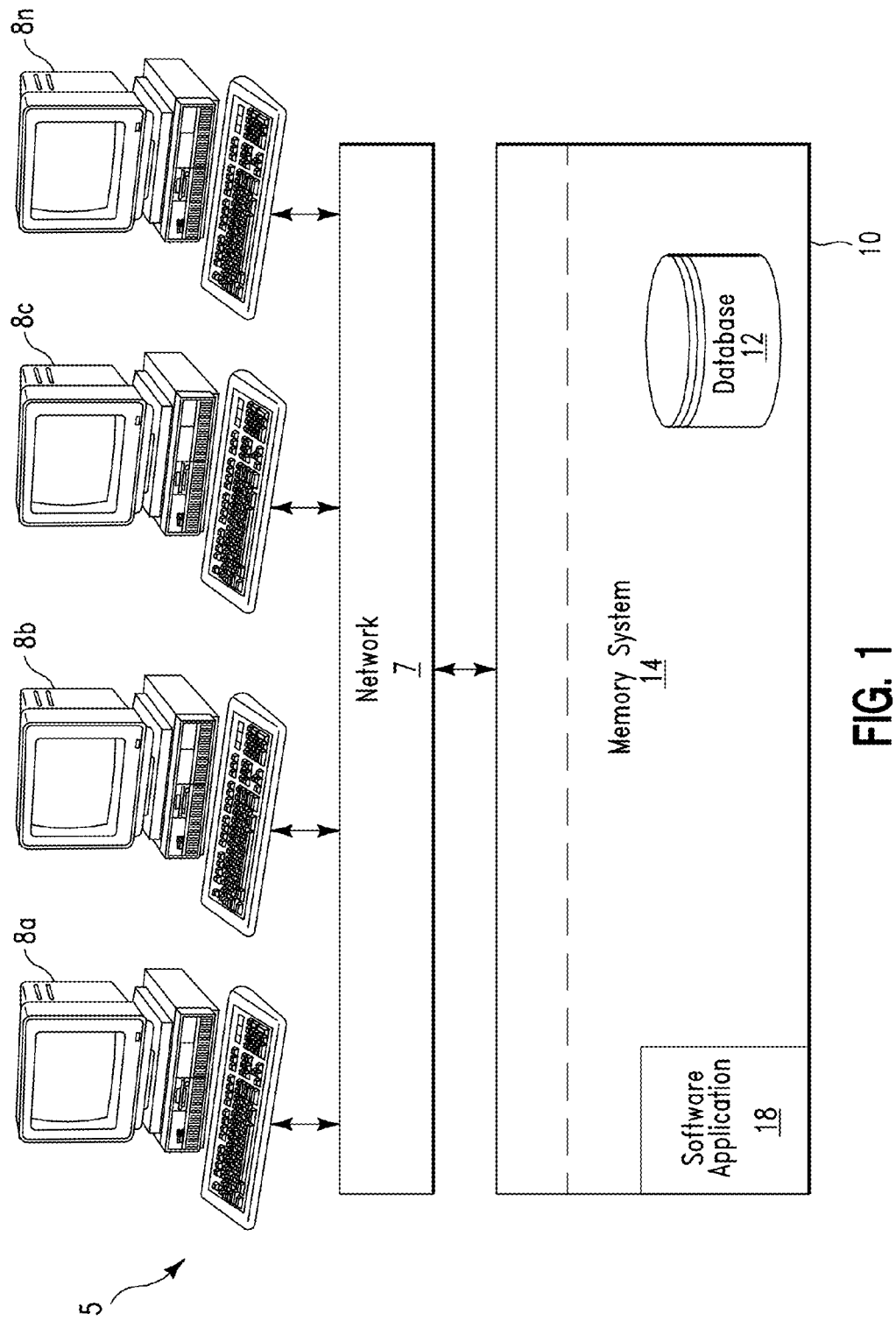
FIG. 1 illustrates a system for managing communications between parties, in accordance with embodiments of the present invention.

FIG. 1 illustrates a system 5 for managing communications between parties, in accordance with embodiments of the present invention. System 5 enables a cultural communication conflict checking process associated with email or instant messaging (IM) messages between multicultural parties. For example, a majority of companies in the world include a multicultural workforce. Therefore, workers of a company must take into account cultural differences when communicating with each other (e.g., an individual does not want to offend someone from another culture). The cultural communication conflict checking process may include:

1. An email or IM composer may be notified if he/she writes (i.e., in an email or IM) any inappropriate (i.e., with respect to a specific culture) content to a particular receiving party.
2. A notification (i.e., with respect to inappropriate content) may comprise highlighting the inappropriate content in the email or IM chat body.
3. Appropriate or suggested content (i.e., with respect to replacing the inappropriate content) may be provided to the receiving party for the associated culture.

System 5 additionally enables a communication (e.g., email, IM, etc) completeness checking process. For example, in business email communications, individuals may (mistakenly or unintentionally) fail to address all questions/clarifications/explanations raised by a sending party (e.g., resulting in a communication gap). In response, system 5 enables a process for checking a communication (e.g., email, IM, etc) to determine if all questions, clarifications, and/or explanations have been addressed.

System 5 of FIG. 1 comprises devices 8a . . . 8n connected through a network 7 to a computing system 10. Devices 8a . . . 8n may comprise any type of telecommunication devices such as, inter alia, a computer, a cellular telephone, a PDA, a laptop computer, a tablet computer, etc. Network 7 may comprise any type of network including, inter alia, a telephone network, a local area network, (LAN), a wide area network (WAN), the Internet, a wireless network, etc. Computing system 10 may comprise any type of computing system(s) including, inter alia, a computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12.

Software application 18 enables the following implementation example with respect to performing a cultural communication conflict checking process associated with email or IM messages between multicultural parties:

1. A user begins to compose an email.
2. Software application 18 retrieves any email addresses used in the email (e.g., under the headings of: To, cc, bcc, etc with priority given sequentially to: To, cc, and bcc).
3. Software application 18 transmits all retrieved email addresses (e.g., usera@countryA.com) to a corporate database to determine a specified culture associated with users associated with the email addresses. For example, usera is associated with countryA.
4. Software application 18 retrieves content from the email (e.g., from the body or subject section of the email)
5. Software application 18 compares the content to a cultural rule database (e.g., database 12 in FIG. 1) comprising cultural rules associated with countryA.
6. Software application 18 determines (i.e., based on the comparison in step 5) that the content conflicts with a cultural rule (i.e., comprises inappropriate content with respect to users associated with countryA).
7. Software application 18 flags and presents the inappropriate content (e.g., by underlining in any coloration, highlighting in any coloration, line weight, font, etc).
8. Software application 18 either:

A. Receives a command (e.g., from the user by right clicking over the presented inappropriate content) for presenting suggested replacement content and presents the suggested replacement content to the user. In response, the user may accept the replacement content for replacing the inappropriate content or be alerted (if the user does not accept the replacement content) that the email comprises the inappropriate content.

B. Automatically presents suggested replacement content to the user. In response, the user may accept the replacement content for replacing the inappropriate content or be alerted (if the user does not accept the replacement content) that the email comprises the inappropriate content.

The following pseudo code examples represent different cultural rules in the cultural rule database:

Example 1

Example 1 comprises a rule for CountryA associated with a preference for indirect statements.

```
IF RECIPIENTS IN ("CountryA")
AND
    (
    E-Mail BODY / SUBJECT CONTAINS "is denied"
    OR
    E-Mail BODY / SUBJECT CONTAINS "is cancelled"
    OR
    E-Mail BODY / SUBJECT CONTAINS "is rejected"
    OR
    E-Mail BODY / SUBJECT CONTAINS "is not approved"
    Etc
    )
THEN
    (
    SUGGESTED WORD / PHRASES IS "Decision has not yet been made"
    OR
    SUGGESTED WORD / PHRASES IS "Conclusion has not yet been made"
    Etc
    )
AND
MESSAGE IS "This is rude way to write in CountryA cultures"
```

Example 2

Example 2 comprises a rule for CountryB associated with a preference for direct statements. IF RECIPIENTS IN ("CountryB")

```
AND
(
    E-Mail BODY / SUBJECT CONTAINS "Decision has not yet"
    OR
    E-Mail BODY / SUBJECT CONTAINS "Conclusion has not yet"
    Etc
)
THEN
(
    SUGGESTED WORD / PHRASES IS "is denied"
    OR
    SUGGESTED WORD / PHRASES IS "is cancelled"
    OR
    SUGGESTED WORD / PHRASES IS "is rejected"
    OR
    SUGGESTED WORD / PHRASES IS "is not approved"
    Etc
)
AND
MESSAGE IS "CountryB cultures demand direct communication, pls
ensure your email should not give false hope to the requester"
```

Example 3

Example 3 comprises a rule for CountryC associated with a preference for individual versus group orientation rules.

```
IF RECIPIENTS IN ("CountryC ")
AND
(
    E-Mail BODY / SUBJECT CONTAINS "done by us"
    OR
    E-Mail BODY / SUBJECT CONTAINS "done by team"
    OR
    E-Mail BODY / SUBJECT CONTAINS "We have done"
    Etc
)
THEN
(
    SUGGESTED WORD / PHRASES IS "done by me"
    OR
    SUGGESTED WORD / PHRASES IS "done by"
    << Name of the person>>
    Etc
)
AND
MESSAGE IS "CountryC cultures comprise people that
are more interested in achievement".
```

Software application 18 enables the following method with respect to performing a communication (e.g., email, IM, etc) completeness checking process:

1. A user begins to receives an email (e.g., comprising a request) and composes a reply to the email.

2. Software application 18 enables a reply email completeness checking functionality.

3. Software application 18 identifies every possible sentence (e.g., from a body and subject) from a recent history of the email. Software application 18 may use different symbols (e.g., "?", ":", ";", etc) as a delimiter to identify the sentences.

4. Software application 18 may segregate the identified sentences into different categories (e.g., questions and non-questions) based on the following logic:

For Questions:
1. Sentences comprising the terms: who, why, when, how, ?, etc.
2. Sentences starting with the terms: Did, Is, Are, etc.
3. Negative sentences such as: Product quality is not good, I have not received the document, etc.
4. User defined logic.

For Non-Questions:
1. Sentences comprising the terms: Thanks in advance, Keep in touch, etc.

5. Software application 18 identifies every possible sentence (e.g., from a body and subject) from the reply email. Software application 18 may use different symbols (e.g., "?", ":", ";", etc) as a delimiter to identify the sentences.

6. Software application 18 segregates the identified sentences (i.e., from the reply email) into different categories (e.g., questions and non-questions).

7. The user commands software application 18 to transmit the reply email.

8. Software application 18 validates the identified sentences (i.e., from the reply email identified in step 6) against the identified sentences (from the recent history of the email identified in step 3) to determine discrepancies (i.e., issues from original email that are not addressed in the reply email). If discrepancies are found, the user is presented with items in the reply email with respect to the original email that have not been addressed and the user is presented with the following selections:

A. Send the email despite the discrepancies.
B. Edit the email.
C. Delegate the decision to send or edit the email to another individual.

9. Software application 18 enables the associated functions (send, edit, or delegate) based on one of the aforementioned selections.

FIGS. 2A-2D illustrate screen shots associated with implementation of a cultural communication conflict checking process associated with email or IM messages between multicultural parties enabled by system 5 of FIG. 1, in accordance with embodiments of the present invention. The screen shots are based on the following implementation example associated with a preference for direct or indirect statements (i.e., in email or IM messages). In the example, individuals in countries A and B prefer direct communications, while people in countries C and D typically prefer indirect communications. When denying a request in countries A and B, a writer will typically apologize, but firmly state that request was denied. In countries C and D, that direct response may seem rude. A country C or D writer may instead write that the decision has not yet been made thereby delaying the answer with the expectation that the requester will not ask again. In country C or D this is viewed as more polite than flatly denying a request. However, in the country A or B this may give false hope to the requester and the requester may ask again.

Figure 2A:
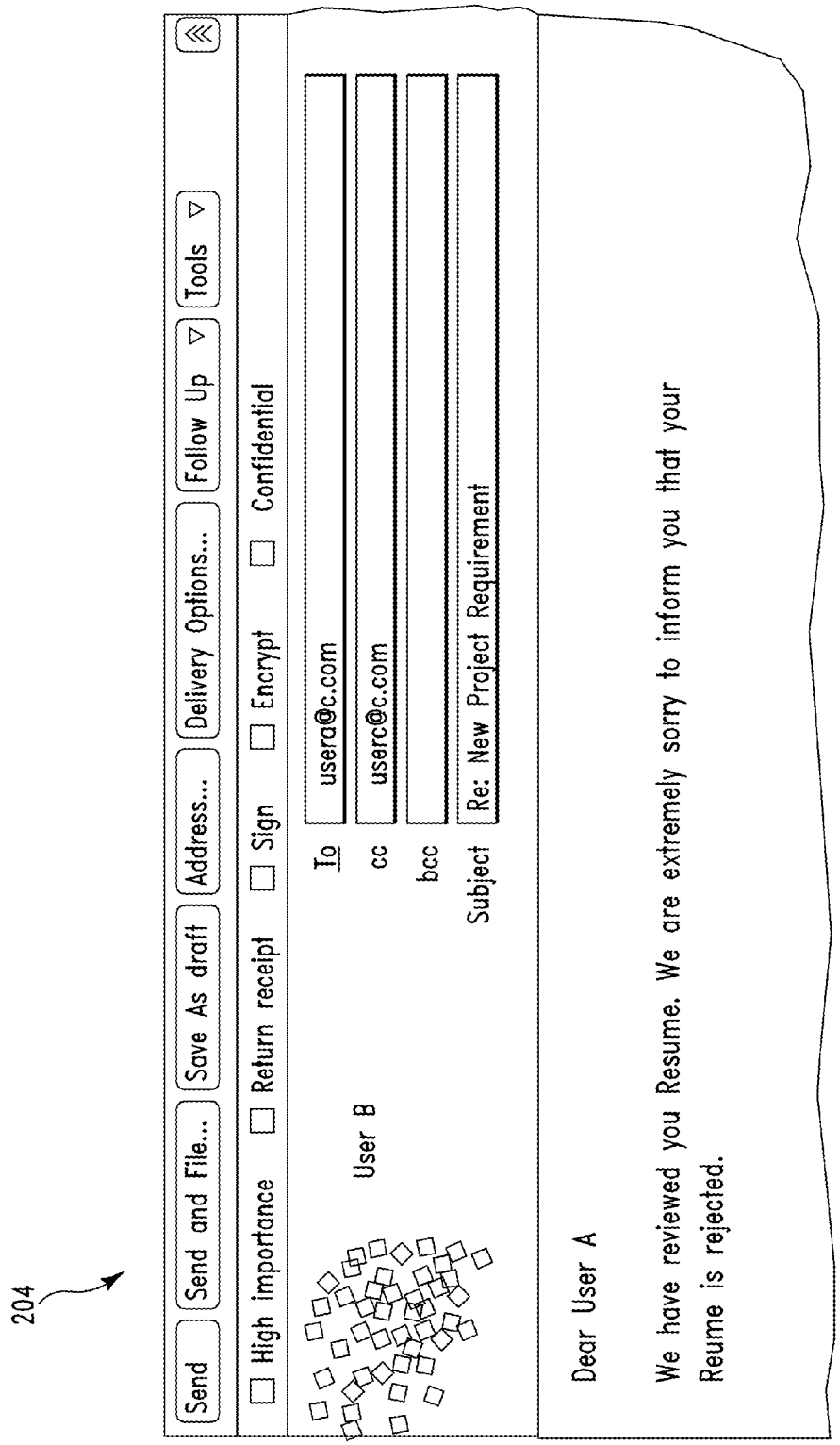
FIGS. 2A-2D illustrate screen shots associated with implementation of a cultural communication conflict checking process enabled by the system of FIG. 1, in accordance with embodiments of the present invention.

FIG. 2A illustrates a screen shot 204 of an email to a usera in country C. The email directly rejects a submitted resume from usera.

Figure 2B:
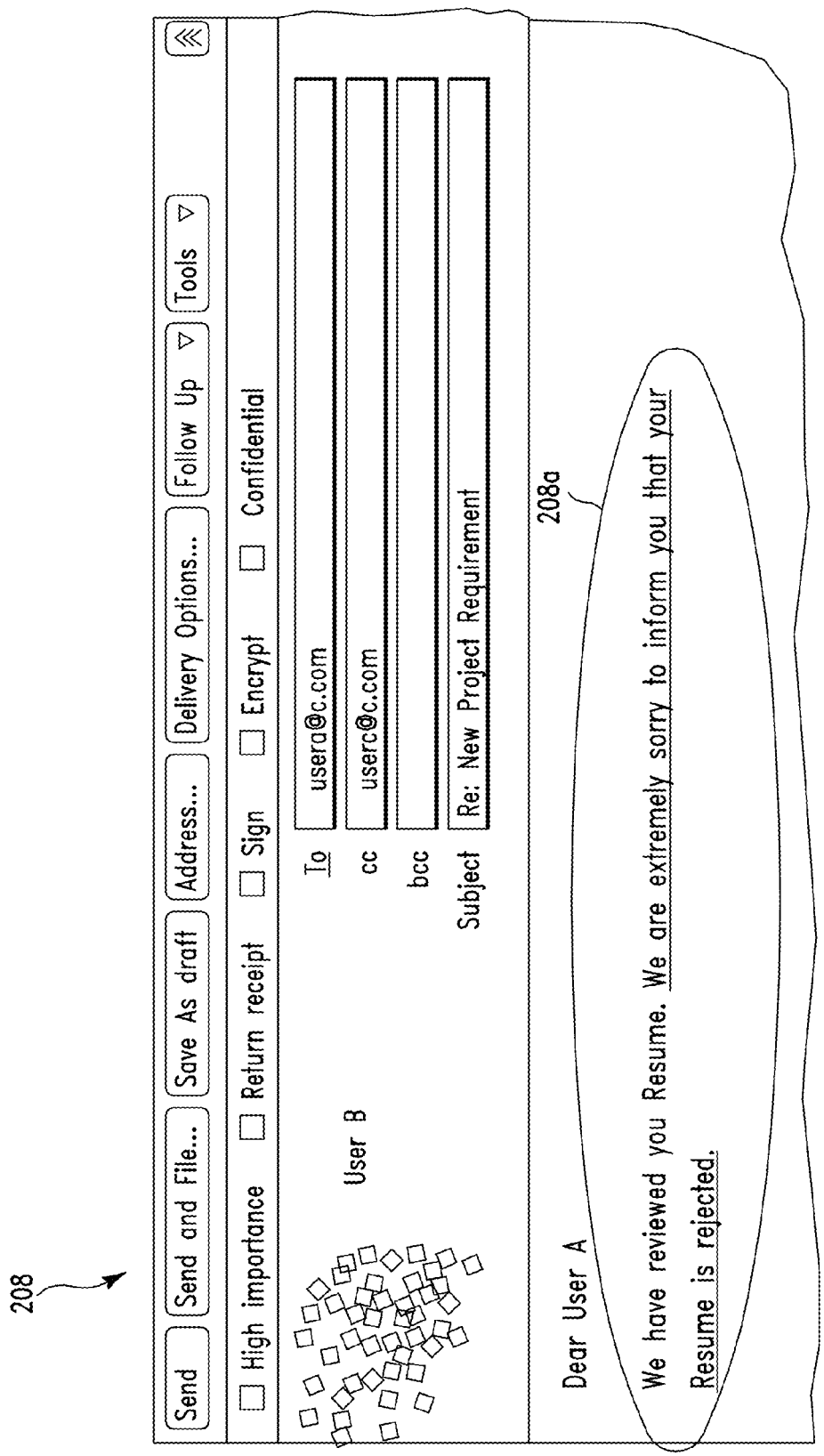

FIG. 2B illustrates a screen shot 208 of the email to usera in country C. In screen shot 208, a software application (i.e., software application 18 of FIG. 1) detects that usera is from country C and does not prefer to receive direct answers. Therefore, response 208a has been highlighted to direct the sender to a cultural communication conflict.

Figure 2C:
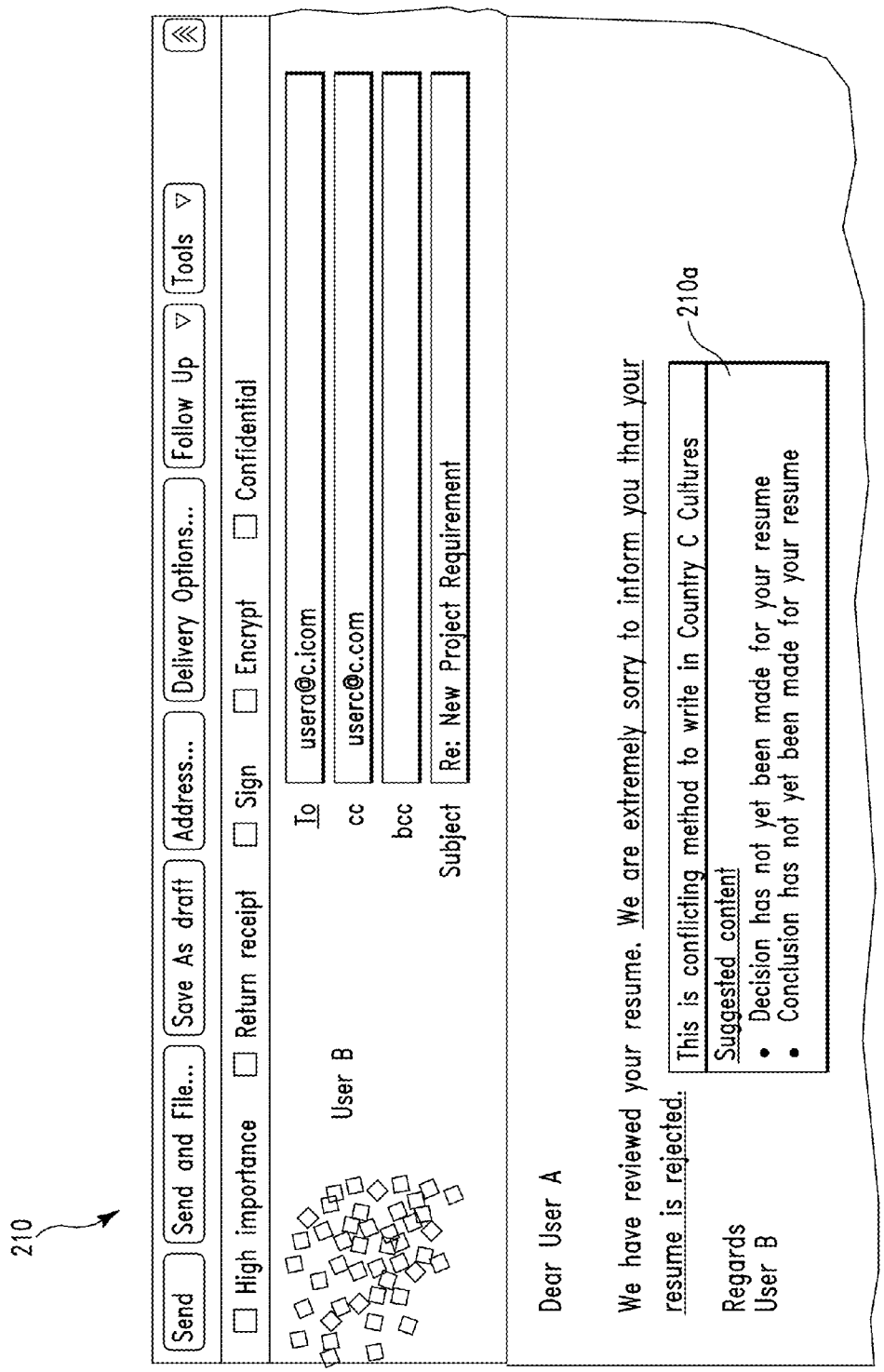

FIG. 2C illustrates a screen shot 210 of the email to usera in countryC. In screen shot 210, the software application (i.e., software application 18 of FIG. 1) presents a popup box 210a with suggested replacement content. The sender may select or decline to use the suggested content.

Figure 2D:
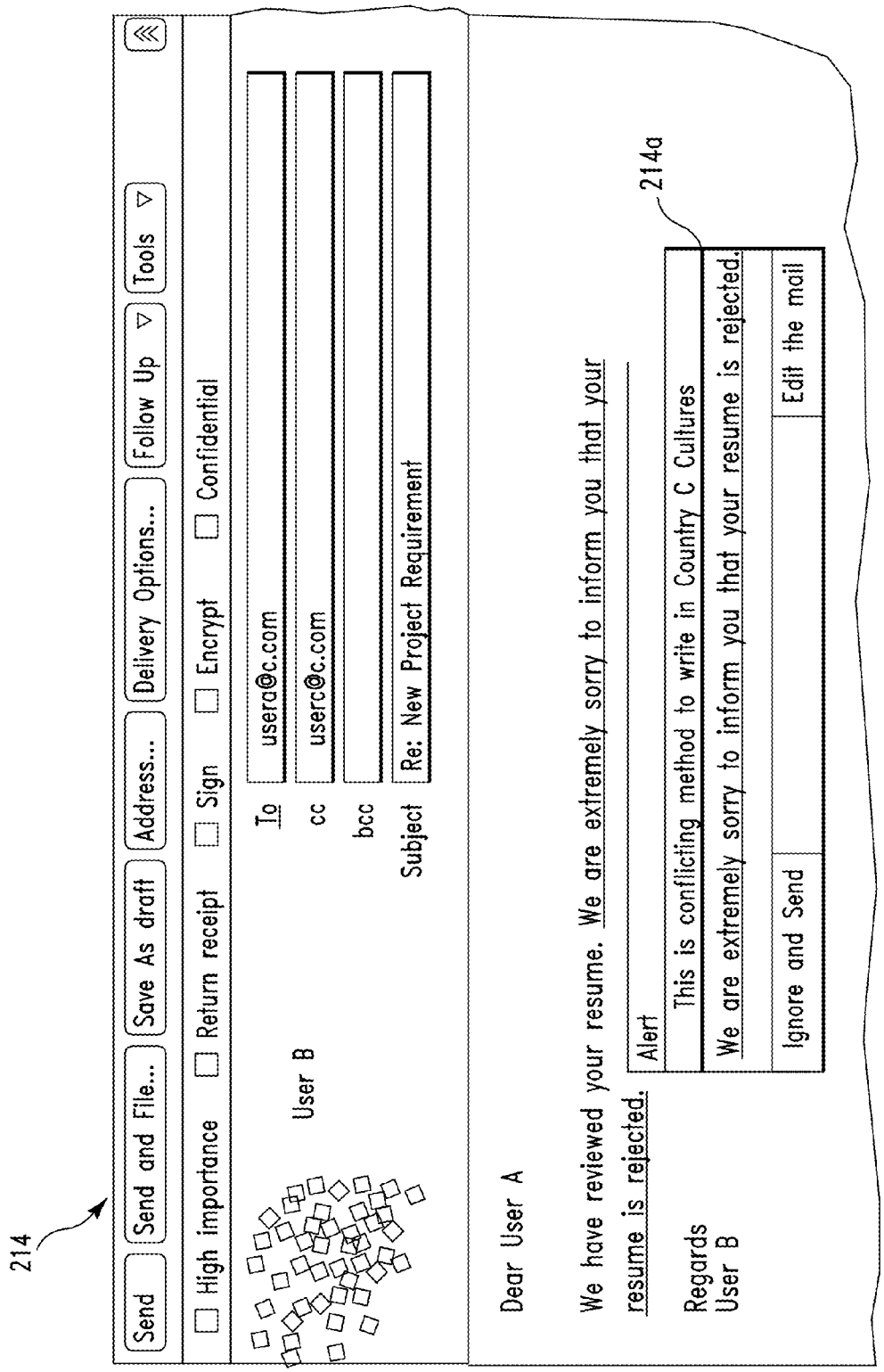

FIG. 2D illustrates a screen shot 214 of the email to usera in countryC. In screen shot 214, the software application (i.e., software application 18 of FIG. 1) presents an alert box 214*a* to alert the sender that no replacement content has been selected.

Figure 3A:
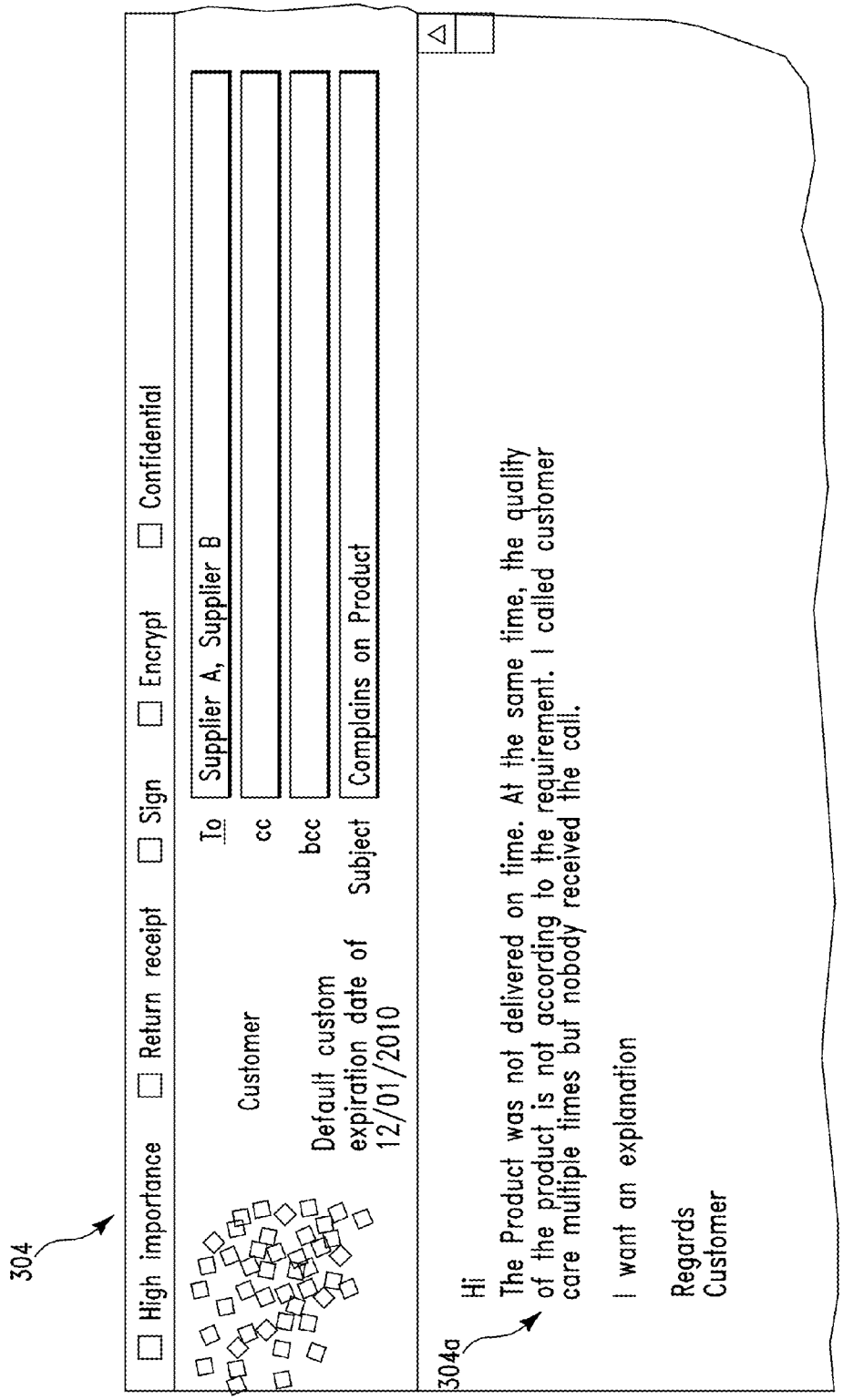
FIGS. 3A-3C illustrate screen shots associated with implementation of performing a communication completeness checking process enabled by the system of FIG. 1, in accordance with embodiments of the present invention.
Figure 3B:
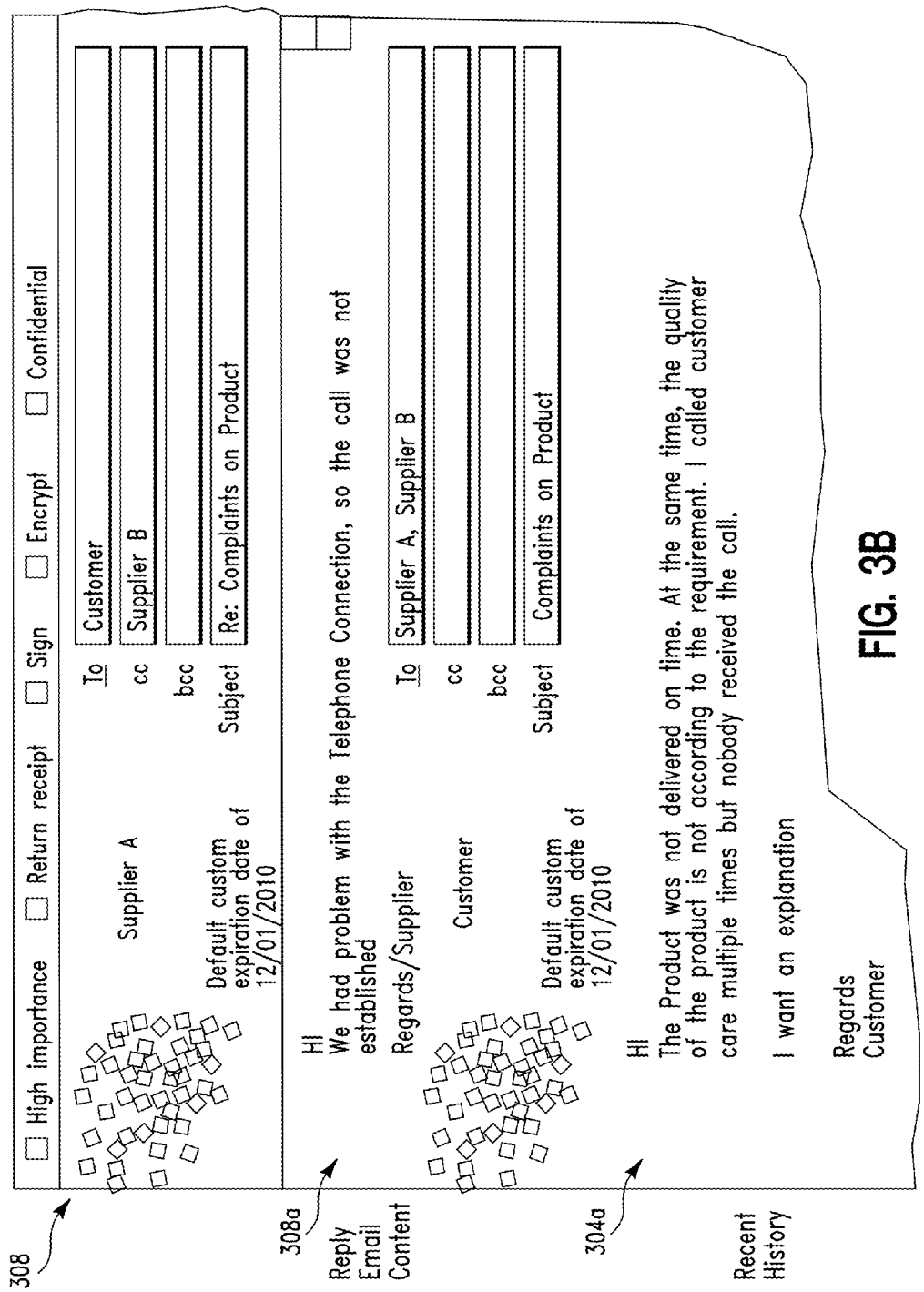
Figure 3C:
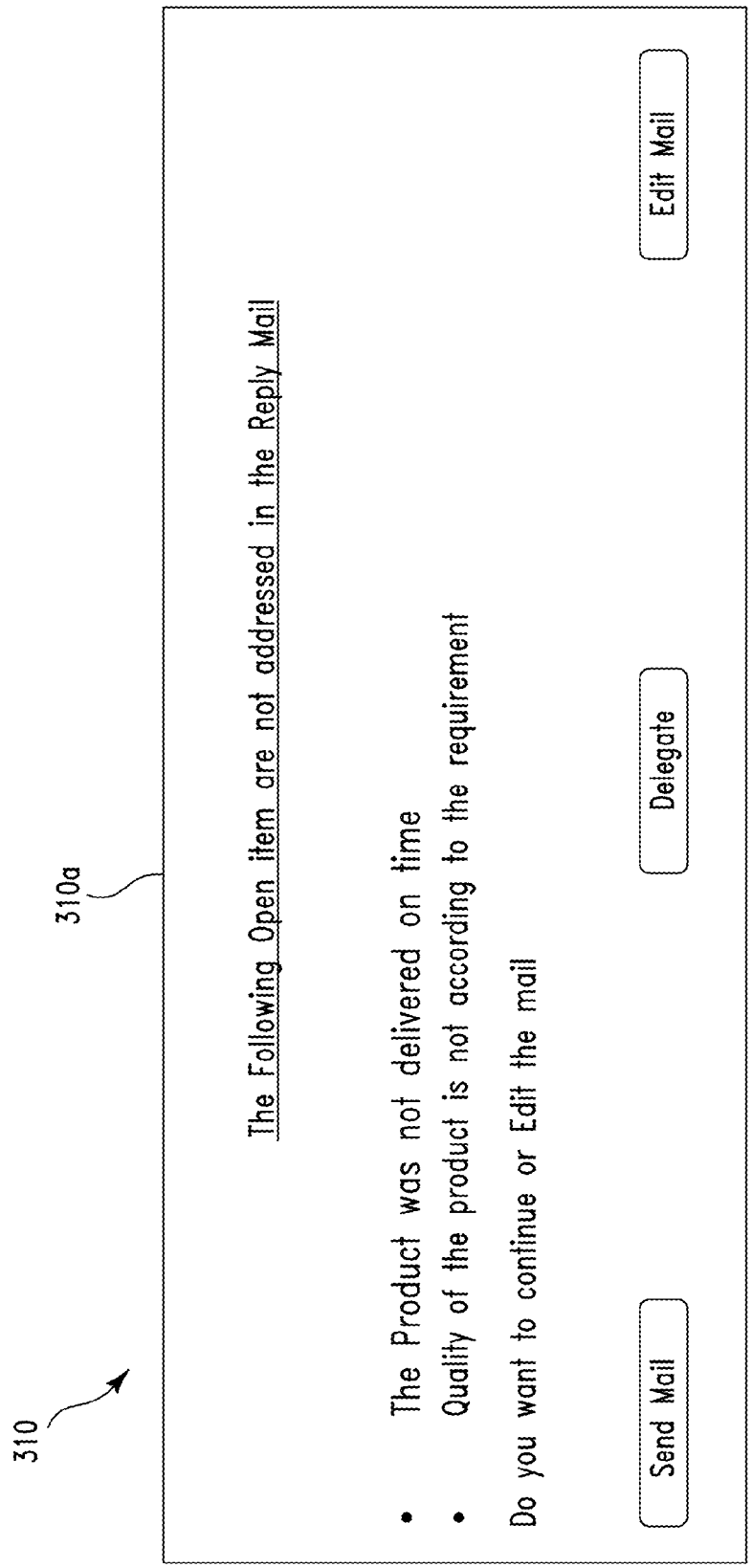

FIGS. 3A-3C illustrate screen shots associated with implementation of performing a communication (e.g., email, IM, etc) completeness checking process enabled by system 5 of FIG. 1, in accordance with embodiments of the present invention.

FIG. 3A illustrates a screen shot 304 of an email to suppliers A and B. The email describes a complaint 304*a* associated with a product.

FIG. 3B illustrates a screen shot 308 of a reply email 308*a* (i.e., to complaint 304*a*). Reply email 308*a* has not addressed all issues from complaint 304*a*. For example:
1. The product was not delivered on time.
2. Quality of product is not according to the requirement.

FIG. 3C illustrates a screen shot 310 of an alert 310*a* to indicate un-addressed issues from complaint 304*a*.

Figure 4:
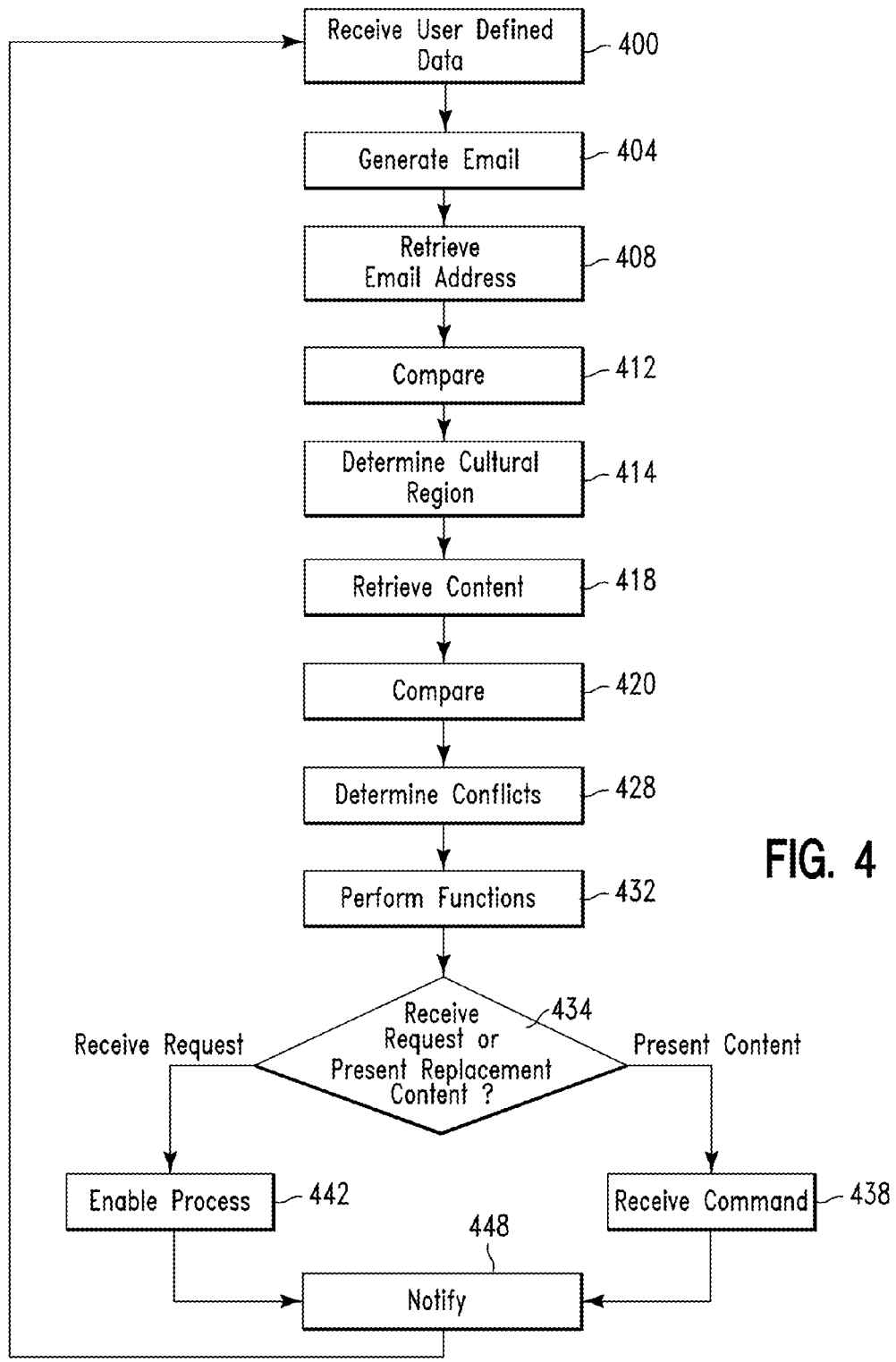
FIG. 4 illustrates an algorithm used by the system of FIG. 1 for implementing a cultural communication conflict checking process, in accordance with embodiments of the present invention.

FIG. 4 illustrates an algorithm used by system 5 of FIG. 1 for implementing a cultural communication conflict checking process associated with email or IM messages between multicultural parties, in accordance with embodiments of the present invention. In step 400, a computer processor (i.e., of a computing system such as, inter alia, computing system 10 of FIG. 1) receives (from a user) first user defined data. In step 404, the computer processor generates a first email comprising the first user defined data. In step 408, the computer processor retrieves (from the first email) an email address for a recipient of the first email. In step 412, the computer processor compares the email address to cultural data (i.e., associated with different countries or cultural regions). In step 414, the computer processor determines (i.e., based on results of comparing the email address to the cultural data) a cultural region associated with the recipient. In step 418, the computer processor retrieves (i.e., from the first email) content from the first email. In step 420, the computer processor compares the content to cultural rules (e.g., retrieved from a cultural rule database such as, inter alia, database 12 in FIG. 1) associated with the cultural region (i.e., determined in step 414). In step 428, the computer processor determines (i.e., based on results of comparing the content to the cultural rules) if any of the content conflicts with the cultural rules. In step 432, the computer processor performs (i.e., based on results of determining if any of the content conflicts with the cultural rules) functions associated with the first email. The functions may include notifying the user that a portion of the content conflicts with the cultural rules. The notification may include, inter alia, underlining the portion of the content, highlighting the portion of the content, changing a coloration of the portion of the content, changing a font of the portion of the content, etc. In step 434 (i.e., in response to the functions performed in step 432), the computer processor receives a user request for suggested replacement content or automatically presents suggested replacement content (i.e., to replace the portion of content).

If in step 434, the computer processor receives a user request for suggested replacement content then step 442, the computer processor performs the following steps:
1. Presenting first suggested replacement content associated with the cultural rules and the portion of the content.
2. Receiving (from the user) a command associated with the first suggested replacement content. The command may include accepting or rejecting the first suggested replacement content. If the command includes accepting the first suggested replacement content then the computer processor may generate and transmit (to a recipient) a modified email (that includes the first suggested replacement content). If the command includes rejecting the first suggested replacement content then the computer processor may generate and broadcast an alert indicating the rejection of the first suggested replacement content. Additionally the computer processor may receive (from the user) user defined replacement content and compare the user defined replacement content to the cultural rules to determine if the user defined replacement content conflicts with the cultural rules.

If in step 434, the computer processor automatically presents suggested replacement content then step 438, the computer processor receives from the user in response to the presentation of the first suggested replacement content a command associated with the first suggested replacement content.

In step 448, the user receives a notification indicating results of step 442 or 438 and step 400 is repeated.

Figure 5:
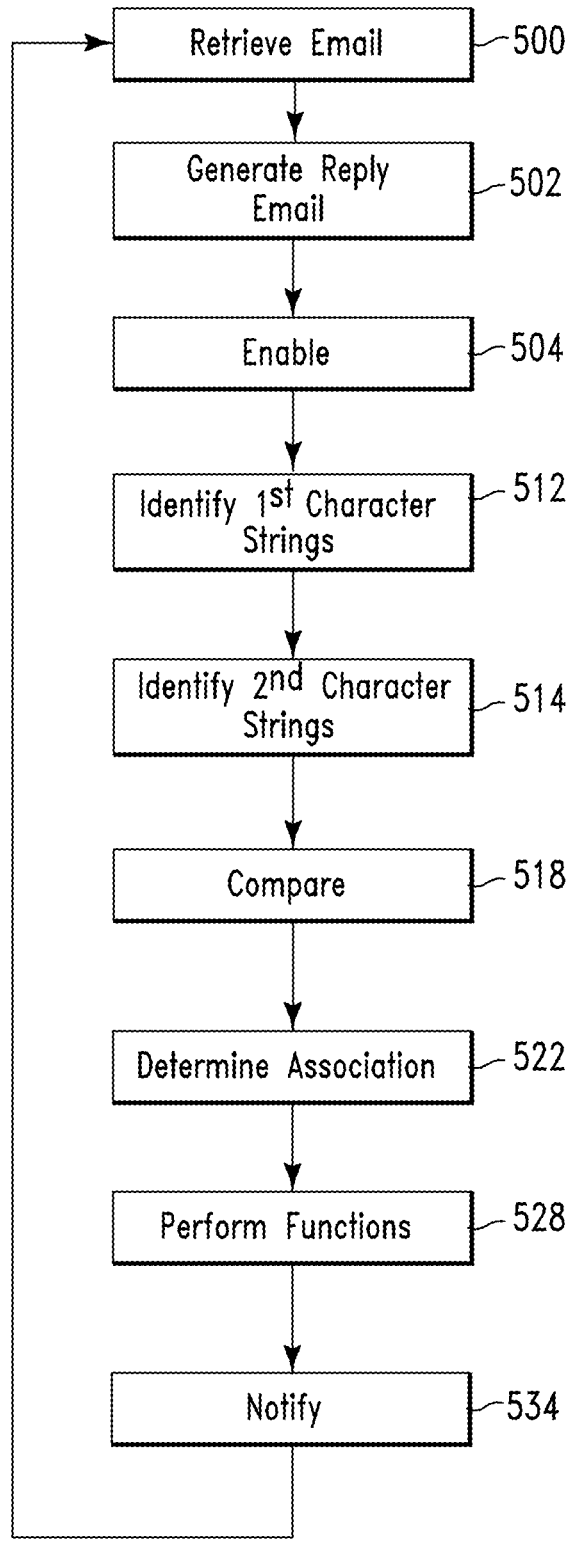
FIG. 5 illustrates an algorithm used by the system of FIG. 1 for performing a communication completeness checking process, in accordance with embodiments of the present invention.

FIG. 5 illustrates an algorithm used by system 5 of FIG. 1 for performing a communication completeness checking process, in accordance with embodiments of the present invention. In step 500, a computer processor (i.e., of a computing system such as, inter alia, computing system 10 of FIG. 1) receives (from a user) an email that includes first data. In step 502, the computer processor generates (i.e., in response to a command and reply data from the user) a reply email associated with the email. The reply email includes the reply data and the first data. In step 504, the computer processor enables (i.e., in response to a user command) email reply check functionality for checking the reply email. In step 512, the computer processor identifies a first plurality of character strings from the first data of the reply email (i.e., all character strings of the first data of the reply email). In step 514, the computer processor identifies a second plurality of character strings from the recent history of the received email (i.e., all character strings of the recent history of the received email). The first and second character strings may be validated using any method including, inter alia, a keyword/phrase percentage matching method, a probability threshold method, a pattern matching method, an association rule method, a knowledge base method, etc. In step 518, the computer processor compares the first plurality of character strings to the second plurality of character strings. In step 522, the computer processor determines (i.e., based on results of step 518) if each character string the second plurality of character strings is associated with and in reply to a character string of the first plurality of character strings. In step 528, the computer processor (i.e., based on results of determining if each character string of the second plurality of character strings is associated with and in reply to a character string of the first plurality of character strings) performs functions associated with the reply email. The functions may include, inter alia: notifying the user that at least one character string of the second plurality of character strings is not associated with and in reply to any of the first plurality of character strings. Additionally, the user may be presented with an editing option for replacing or adding to any of the second plurality of character strings.

Figure 6:
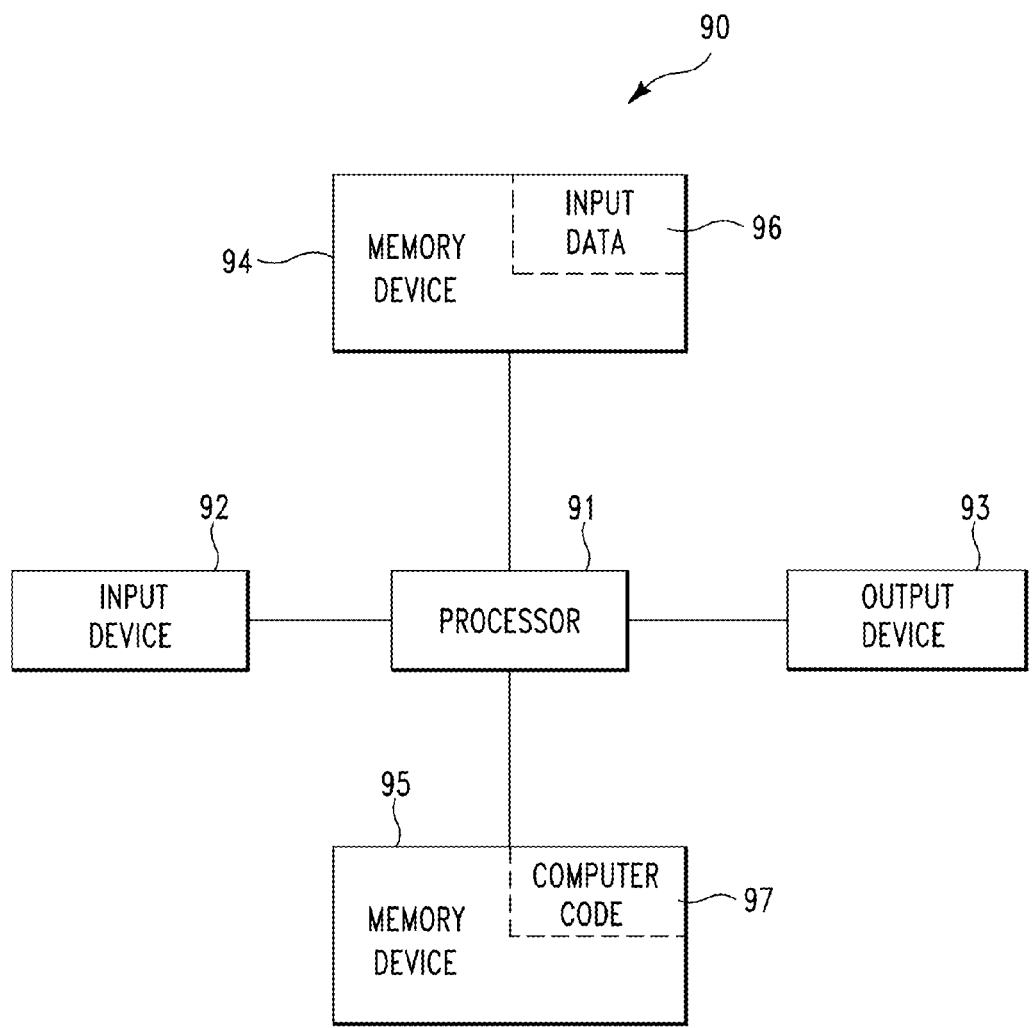
FIG. 6 illustrates a computer apparatus used for managing communications between parties, in accordance with embodiments of the present invention.

FIG. 6 illustrates a computer apparatus 90 (e.g., computing system 10 of FIG. 1) used for implementing a cultural communication conflict checking process or performing a communication completeness checking process, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for implementing a cultural communication conflict checking process or performing a communication completeness checking process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 3 and 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to implement a cultural communication conflict checking process or perform a communication completeness checking process. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for implementing a cultural communication conflict checking process or performing a communication completeness checking process. In another embodiment, the invention provides a method that performs the process steps of the invention on a subscription, advertising, and/or fee basis. That is, a service provider, such as a Solution Integrator, could offer to implement a cultural communication conflict checking process or perform a communication completeness checking process. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

receiving, by a computer processor of a computing device from a user, first user defined data;

generating, by said computer processor, a first email comprising said first user defined data;

retrieving, by said computer processor from said first email, an email address associated with a recipient for said first email;

transmitting, by said computer processor, said email address to a corporate database;

comparing, by said computer processor, said email address to cultural data of said corporate database;

determining, by said computer processor based on results of said comparing said email address, a cultural region associated with a specified culture of a specified country of said recipient;

retrieving, by said computer processor from said first email, content from a body and subject section of said first email;

comparing, by said computer processor, specified terms of sentences of said content to cultural rules associated with said cultural region associated with said specified culture of said specified country, said cultural rules comprising rules defining cultural customs, cultural communication styles, and appropriate/inappropriate cultural content associated with said cultural customs;

segregating, by said computer processor, said sentences into different categories;

determining, by said computer processor based on results of said comparing said content, that a first term of a first sentence of said content conflicts with said cultural rules;

presenting within a body of said first email below said content comprising said first sentence, by said computer processor to said user, an alert box indicating that said first sentence of said content conflicts with said cultural rules, wherein said alert box comprises an additional presented copy of said first sentence and commands for ignoring and sending said first email, editing said first email, and delegating a decision for sending or editing said first email to an additional user; and performing, by said computer processor based on results of said determining that said first term conflicts with said cultural rules, functions associated with said first email and said commands of said alert box.

2. The method of claim 1, wherein said determining determines that a first portion of said content conflicts with said cultural rules, and wherein said performing said functions comprises:

notifying, by said computer processor, said user that said first portion of said content conflicts with said cultural rules.

3. The method of claim 2, wherein said notifying comprises performing a function selected from the group consisting of underlining said first portion of said content, highlighting said first portion of said content, changing a coloration of said first portion of said content, and changing a font of said first portion of said content.

4. The method of claim 2, further comprising:

receiving, by said computer processor from said user, a request for suggested replacement content associated with said cultural rules and said first portion of said content;

presenting, by said computer processor to said user in response to said request, first suggested replacement content associated with said cultural rules and said first portion of said content; and receiving, by said computer processor from said user in response to said presenting, a command associated with said first suggested replacement content.

5. The method of claim 4, wherein said command specifies acceptance of said first suggested replacement content, and wherein said method further comprises:

generating, by said computer processor, a modified email, wherein said generating said modified email comprises replacing said first portion of said content with said first suggested replacement content; and transmitting, by said computer processor to said recipient, said modified email.

6. The method of claim 4, wherein said command specifies rejection of said first suggested replacement content, and wherein said method further comprises:

generating, by said computer processor, an alert indicating said rejection of said first suggested replacement content;

presenting, by said computer processor to said user via a monitor, said alert within an alert box; and receiving, by said computer processor in response to said alert, a command indicating a function associated with said alert.

7. The method of claim 6, further comprising:

receiving, by said computer processor from said user, user defined replacement content associated with said first portion of said content;

comparing, by said computer processor, said user defined replacement content to said cultural rules associated with said cultural region;

determining, by said computer processor based on results of said comparing said user defined replacement content, if any of said user defined replacement content conflicts with said cultural rules; and performing, by said computer processor based on results of said determining if any of said user defined replacement content conflicts with said cultural rules, functions associated with said first email.

8. The method of claim 2, further comprising:

automatically presenting, by said computer processor to said user in response to results of said determining, first suggested replacement content associated with said cultural rules and said first portion of said content; and receiving, by said computer processor from said user in response to said presenting, a command associated with said first suggested replacement content.

9. The method of claim 1, further comprising:

providing at least one support service for at least one of creating, integrating, hosting, maintaining, and deploying computer-readable code in said computing system, wherein the code in combination with the computing system is capable of performing: said receiving, said generating, said retrieving said email address, said comparing said email address, said determining said cultural region, said retrieving said content, said comparing said content, said determining if any of said content conflicts with said cultural rules, and said performing.

10. A computer program product, comprising a computer readable hardware storage device storing a computer readable program code, said computer readable program code comprising an algorithm adapted to implement a method within a computing device, said method comprising:

receiving, by a computer processor of said computing device from a user, first user defined data;

generating, by said computer processor, a first email comprising said first user defined data;

retrieving, by said computer processor from said first email, an email address associated with a recipient for said first email;

transmitting, by said computer processor, said email address to a corporate database;

comparing, by said computer processor, said email address to cultural data of said corporate database;

determining, by said computer processor based on results of said comparing said email address, a cultural region associated with a specified culture of a specified country of said recipient;

retrieving, by said computer processor from said first email, content from a body and subject section of said first email;

comparing, by said computer processor, specified terms of sentences of said content to cultural rules associated with said cultural region associated with said specified culture of said specified country, said cultural rules comprising rules defining cultural customs, cultural communication styles, and appropriate/inappropriate cultural content associated with said cultural customs;

segregating, by said computer processor, said sentences into different categories;

determining, by said computer processor based on results of said comparing said content, that a first term of a first sentence of said content conflicts with said cultural rules;

presenting within a body of said first email below said content comprising said first sentence, by said computer processor to said user, an alert box indicating that said first sentence of said content conflicts with said cultural rules, wherein said alert box comprises an additional presented copy of said first sentence and commands for ignoring and sending said first email, editing said first email, and delegating a decision for sending or editing said first email to an additional user; and performing, by said computer processor based on results of said determining that said first term conflicts with said cultural rules, functions associated with said first email and said commands of said alert box.

11. The method of claim 1, wherein said cultural communication styles comprise indirect communication styles and direct communication styles.

12. A computer system comprising a computer processor coupled to a computer-readable memory unit, the memory unit comprising instructions that when executed by the computer processor implements a method comprising:

receiving, by the computer processor from a user, first user defined data;

generating, by said computer processor, a first email comprising said first user defined data;

retrieving, by said computer processor from said first email, an email address associated with a recipient for said first email;

transmitting, by said computer processor, said email address to a corporate database;

comparing, by said computer processor, said email address to cultural data of said corporate database;

determining, by said computer processor based on results of said comparing said email address, a cultural region associated with a specified culture of a specified country of said recipient;

retrieving, by said computer processor from said first email, content from a body and subject section of said first email;

comparing, by said computer processor, specified terms of sentences of said content to cultural rules associated with said cultural region associated with said specified culture of said specified country, said cultural rules comprising rules defining cultural customs, cultural communication styles, and appropriate/inappropriate cultural content associated with said cultural customs;

segregating, by said computer processor, said sentences into different categories;

determining, by said computer processor based on results of said comparing said content, that a first term of a first sentence of said content conflicts with said cultural rules;

presenting within a body of said first email below said content comprising said first sentence, by said computer processor to said user, an alert box indicating that said first sentence of said content conflicts with said cultural rules, wherein said alert box comprises an additional presented copy of said first sentence and commands for ignoring and sending said first email, editing said first email, and delegating a decision for sending or editing said first email to an additional user; and performing, by said computer processor based on results of said determining that said first term conflicts with said cultural rules, functions associated with said first email and said commands of said alert box.

* * * * *